Patented Dec. 4, 1934

1,983,006

UNITED STATES PATENT OFFICE 1,983,006

ANTIRUST PAINT

Hermann Schladebach, Dessau in Anhalt, and Herbert Hähle, Dessau-Ziebigk in Anhalt, Germany, assignors to I. G. Farbenindustrie Aktiengesellschaft, Frankfort-on-the-Main, Germany, a corporation of Germany No Drawing. Application January 31, 1929, Serial No. 336,641. In Germany February 2, 1928

11 Claims. (Cl. 134—79)

Our present invention relates to rust-proof paints and, more particularly, to those in which cellulose esters of higher fatty acids are used.

Nitrocellulose lacquers have been proposed as agents for preventing rust, but such lacquers, as well as those made from cellulose acetate, are not suitable for the purpose, because under normal conditions there is always some water adsorbed on the surface, and in particular in the pores of all metals; this water becomes covered by the impermeable film of lacquer and cannot evaporate. In the case of iron, there is a particular danger, namely that due to the acid reaction, which is soon developed in consequence of the decomposition of the cellulose ester by the action of the ultra-violet rays of sunlight.

According to this invention iron surfaces are protected from corrosion by the application of a paint made from an organic cellulose ester, of which, in the event of any decomposition occurring, the acid radical forms with the iron an insoluble compound so that between the skin of varnish and the metal there is produced a layer of a metal salt insoluble in water.

Such esters are, for example, those derived from acids of a higher molecular weight, preferably of fatty acids, saturated or not, containing more than seven carbon atoms, such as stearic acid or lauric acid. These cellulose esters of higher fatty acids have the further advantage when compared with nitrocellulose or acetylcellulose that they are remarkably stable to attack, even by strong alkalies and acids, which fact in conjunction with the aforesaid anti-rust quality renders them particularly useful in industry.

The said esters are employed in the form of their solutions in organic solvents, such as hydrocarbons. For example, a solution of cellulose trilaurate in a mixture of xylene and benzene constitutes a very good anti-rust paint; such a solution can be applied well and from a physical point of view gives a very good coating which, particularly in conjunction with pigments, adheres very well without developing cracks in consequence of expansion or contraction of the metal with change of temperature.

To the solution of cellulose ester other substances can be added, for instance a drying oil, a coloring matter, a softening agent, a cellulose ether insoluble in water or any filling agent.

Suitable pigments are red lead, red oxide of iron, titanium white, zinc white or metal bronzes in appropriate dispersion.

The anti-rust effect of a solution of a cellulose ester of the kind in question may be enhanced by addition of a heavy metal salt of an acid of high molecular weight, such as a fatty acid, a naphthenic acid or a resin acid. Compounds, such as copper naphthenate, copper oleate, lead naphthenate, ferric stearate, ferric laurate, ferric resinate dissolve very freely in the organic solvents used for dissolving the cellulose esters and are therefore quite uniformly distributed after the coating has dried; on the other hand, these metal compounds are quite insoluble in water and repel water.

The layer of anti-rust paint may be covered by another layer, such as one of another cellulose lacquer, an oil varnish or wood oil.

The following examples are prescriptions for anti-rust paints according to the invention, the parts being by weight:—

Example 1

15 parts of cellulose trilaurate
50 parts of benzene
50 parts of xylene.

Example 2

20 parts of cellulose trilaurate
50 parts of benzene
50 parts of xylene
5 parts of copper naphthenate or
2 parts of ferric resinate.

Instead of copper naphthenate there may be used, for example, copper oleate, lead naphthenate, ferric laurate or ferric stearate.

Example 3

15 parts of cellulose trilaurate
15 parts of benzyl cellulose
100 parts of benzene
100 parts of xylene.

Example 4

20 parts of cellulose trilaurate
50 parts of benzene
25 parts of toluene
25 parts of xylene
20 parts of titanium white (or zinc white, white lead or copper bronze).

In these examples the cellulose ester should be dissolved in the solvent at the ordinary temperature or at the temperature of the water-bath, the heavy metal salt added to the solution and the pigment then stirred in.

Applied to the surface of iron articles these anti-rust paints form after drying coherent, fine films having an outstanding resistance against the action of atmospheric influences. Neither intensive solar radiation nor severe coldness, neither rain nor ice, neither acid nor basic impurities contained in the atmosphere cause bursting of the film, so that iron articles coated with our new rust-inhibiting preparation, remain unattacked even when exposed for years to the influences of the weather.

We claim:—

1. Anti-rust paint consisting of a solution in a liquid aromatic hydrocarbon of a cellulose ester of a higher fatty acid with more than seven carbon atoms and of a metal salt of the group consisting of ferric, lead and copper salts of naphthenic, oleic, stearic and resinic acids.

2. Anti-rust paint consisting of a solution in a liquid aromatic hydrocarbon of a cellulose laurate and of a metal salt of the group consisting of ferric, lead and copper salts of naphthenic, oleic, stearic and resinic acids.

3. Anti-rust paint consisting of a solution of a cellulose laurate in a mixture of benzene and xylene, and of a metal salt of the group consisting of ferric, lead and copper salts of naphthenic, oleic, stearic and resinic acids.

4. An iron article coated with a film the binder of which consists essentially of a cellulose derivative at least half of which is a cellulose ester of an aliphatic acid with more than seven carbon atoms.

5. An iron article coated with a film the binder of which consists essentially of a cellulose derivative at least half of which is a cellulose trilaurate.

6. An iron article coated with a film containing a cellulose trilaurate and a metal salt of the group consisting of ferric, lead and copper salts of naphthenic, oleic, stearic and resinic acid.

7. An anti-rust paint the binder thereof consisting essentially of a solution of a cellulose derivative at least half of which is an ester of a higher fatty acid containing more than seven carbon atoms in an organic evaporating solvent.

8. An anti-rust paint the binder thereof consisting essentially of a solution of a cellulose derivative at least half of which is an ester of a higher fatty acid containing more than seven carbon atoms in a liquid aromatic hydrocarbon.

9. An anti-rust paint the binder thereof consisting essentially of a solution of a cellulose derivative at least half of which is cellulose trilaurate in an organic evaporating solvent.

10. An anti-rust paint the binder thereof consisting essentially of a solution of a cellulose derivative at least half of which is cellulose trilaurate in a liquid aromatic hydrocarbon.

11. An anti-rust paint the binder thereof consisting essentially of a solution of a cellulose derivative at least half of which is cellulose trilaurate in a mixture of benzene and xylene.

HERMANN SCHLADEBACH.
HERBERT HÄHLE.